United States Patent
Jung et al.

(10) Patent No.: US 10,203,782 B2
(45) Date of Patent: Feb. 12, 2019

(54) STYLUS PEN AND TOUCH SENSING SYSTEM AND DRIVING METHOD OF THE SAME

(71) Applicant: LG Display Co., Ltd., Seoul (KR)

(72) Inventors: Doyoung Jung, Seoul (KR); Hyunguk Jang, Gyeonggi-do (KR); Sungchul Kim, Gyeonggi-do (KR); Sanghyuck Bae, Gyeonggi-do (KR); Sungsu Han, Gyeonggi-do (KR); Suyun Ju, Gangwon-do (KR)

(73) Assignee: LG Display Co., Ltd., Seoul (KR)

( * ) Notice: Subject to any disclaimer, the term of this patent is extended or adjusted under 35 U.S.C. 154(b) by 378 days.

(21) Appl. No.: 15/215,769

(22) Filed: Jul. 21, 2016

(65) Prior Publication Data

US 2017/0031465 A1 Feb. 2, 2017

(30) Foreign Application Priority Data

Jul. 31, 2015 (KR) ........................ 10-2015-0108839

(51) Int. Cl.
*G06F 3/045* (2006.01)
*G06F 3/038* (2013.01)
*G06F 3/044* (2006.01)
*G06F 3/0354* (2013.01)

(52) U.S. Cl.
CPC ........ *G06F 3/0383* (2013.01); *G06F 3/03545* (2013.01); *G06F 3/044* (2013.01); *G06F 2203/04108* (2013.01)

(58) Field of Classification Search
CPC .... G06F 3/0383; G06F 3/044; G06F 3/03545; G06F 2203/04108
See application file for complete search history.

(56) References Cited

U.S. PATENT DOCUMENTS

| | | | | |
|---|---|---|---|---|
| 2011/0155479 | A1* | 6/2011 | Oda | G06F 3/03545 178/18.06 |
| 2015/0070293 | A1* | 3/2015 | Yu | G06F 3/044 345/174 |
| 2015/0324029 | A1* | 11/2015 | Bakken | G06F 3/044 345/174 |

FOREIGN PATENT DOCUMENTS

| | | |
|---|---|---|
| KR | 10-2014-0043299 A | 4/2014 |
| WO | 2012/057888 A1 | 5/2012 |

\* cited by examiner

*Primary Examiner* — Nelson Rosario
*Assistant Examiner* — Andrew Lee
(74) *Attorney, Agent, or Firm* — Morgan, Lewis & Bockius LLP

(57) ABSTRACT

A touch sensing system comprises a touchscreen with a plurality of touch electrodes, to which a touchscreen driving signal is applied, and a stylus pen that generates a pen driving signal based on the touchscreen driving signal and sends the same to the touchscreen. The stylus pen comprises: an amplifier that amplifies the touchscreen driving signal to generate an amplified signal; a comparator that compares the amplified signal with a preset reference voltage to generate a comparator output signal; and a signal processor that measures the pulse width of the comparator output signal, adjusts an amount of delay based on a measurement, and determines an output timing of the pen driving signal based on an adjusted amount of delay to synchronize the pen driving signal with the touchscreen driving signal.

17 Claims, 15 Drawing Sheets

STYLUS PEN AND TOUCH SENSING SYSTEM AND DRIVING METHOD OF THE SAME

This application claims the priority benefit of Korean Patent Application No. 10-2015-0108839 filed on Jul. 31, 2015, which is incorporated herein by reference for all purposes as if fully set forth herein.

BACKGROUND OF THE INVENTION

Field of the Invention

This document relates to a touch sensing system, and more particularly, to a touch sensing system capable of touch input from a stylus pen and a driving method of the same.

Discussion of the Related Art

User interfaces (UI) enable humans (users) to easily control various types of electronic devices as they want. Typical examples of the user interfaces include keypads, keyboards, mice, on-screen displays (OSD), and remote controllers with an infrared communication capability or radio frequency (RF) communication capability. The user interface technology is continuing to make progress toward higher user sensitivity and ease of operation. Recently, user interfaces have been evolving into touch UI, voice recognition UI, 3D UI, etc.

The touch UI has been indispensably used in portable information appliances. The touch UI is implemented by building a touchscreen on the screen of a display device. Such a touchscreen can be implemented as a capacitive touchscreen. A touchscreen having capacitive touch sensors detects touch input by sensing a capacitance change, i.e., a change in the amount of electrical charge between the touch sensors when a finger or conductive object touches (or hovers over) a touch sensor.

The capacitive touch sensors can be implemented as self-capacitance sensors or mutual capacitance sensors. The electrodes of the self-capacitance sensors are connected to sensor lines oriented in one direction on a one-to-one basis. The mutual capacitance sensors are formed at the intersections of sensor lines Tx and Rx orthogonal to each other with a dielectric layer interposed between them.

Recently, stylus pens are widely used as a HID (human interface device), as well as fingers, in smartphones, smartbooks, etc. The stylus pens allows for more accurate input than fingers.

There are two types of stylus pens: active and passive. With the passive stylus, touch position detection is difficult because the changes in capacitance at contact points with the touchscreen are very subtle. With the active stylus, touch position detection is easier compared to the passive stylus because the active stylus itself generates and outputs a pen driving signal at a point where it hovers over or touches the touchscreen.

By the way, the related art active stylus pen uses a pen driving signal that has a different frequency than a touchscreen driving signal, in order to avoid interference with the touchscreen driving signal, as disclosed in Korean Patent Application Laid-Open Publication No. 10-2014-0043299 (also published as WO 2012/057888). In this technology, the touch module requires a sensing circuit for receiving the pen driving signal, which results in a rise in manufacturing costs.

One of the solutions suggested to overcome this problem is the technology that receives the touchscreen driving signal from the active stylus pen and then generates the pen driving signal in synchronization with the touchscreen driving signal to apply it the touchscreen.

The strength of the touchscreen driving signal received by the stylus pen decreases as the distance between the stylus pen and the touchscreen decreases, because of the air gap. That is, the strength of a first touchscreen driving signal received by the stylus pen while touching the touchscreen is less than the strength of a second touchscreen driving signal received by the stylus pen while hovering over the touchscreen.

In order to get a desired touch sensing signal, the pen driving signal needs to be synchronized with the touchscreen driving signal. However, if the strength of the touchscreen driving signal received by the stylus pen changes depending on the proximity between the touchscreen and the stylus pen, the synchronization is distorted. Once the synchronization between the pen driving signal and the touchscreen driving signal is distorted, the touch sensing signal becomes weaker, thus leading to low touch performance.

SUMMARY

Accordingly, the present invention is directed to a stylus pen and touch sensing system and driving method of the same that substantially obviates one or more of the problems due to limitations and disadvantages of the related art.

An object of the present invention is to provide a touch sensing system which has a stylus pen that generates a pen driving signal based on a touchscreen driving signal from a touchscreen and applies it to the touchscreen, and which allows the pen driving signal to be precisely synchronized with the touchscreen driving signal regardless of the proximity between the stylus pen and the touchscreen, and a driving method of the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch sensing system comprises a touchscreen with a plurality of touch electrodes, to which a touchscreen driving signal is applied, and a stylus pen that generates a pen driving signal based on the touchscreen driving signal and transmits the same to the touchscreen. The stylus pen comprises: an amplifier that amplifies the touchscreen driving signal to generate an amplified signal; a comparator that compares the amplified signal with a preset reference voltage to generate a comparator output signal; and a signal processor that measures the pulse width of the comparator output signal, adjusts an amount of delay based on a measurement, and determines an output timing of the pen driving signal based on an adjusted amount of delay to synchronize the pen driving signal with the touchscreen driving signal.

In another aspect, a driving method of a touch sensing system comprises receiving a touchscreen driving signal by a stylus pen by bringing the stylus pen into contact with the touchscreen or hovering the stylus pen over the touchscreen; amplifying the touchscreen driving signal to generate an amplified signal; comparing the amplified signal with a preset reference voltage to generate a comparator output signal; measuring the pulse width of the comparator output signal, adjusting the amount of delay based on the measurement, and determining the output timing of the pen driving signal based on an adjusted amount of delay to synchronize the pen driving signal with the touchscreen driving signal; and sending the pen driving signal synchronized with the touchscreen driving signal to the touchscreen from the stylus pen.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
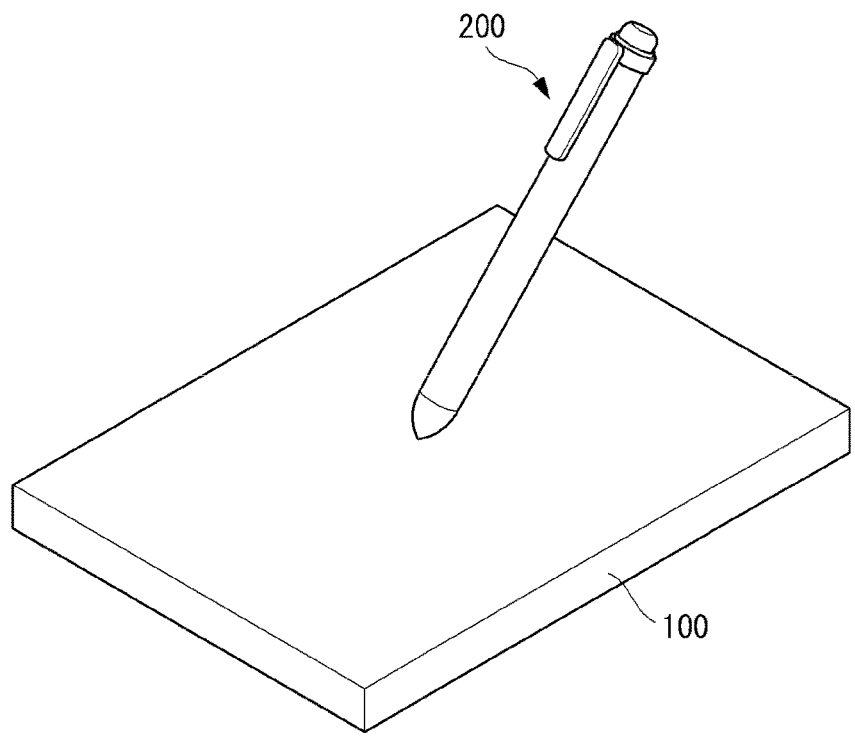
FIG. 1 shows a touch sensing system according to an exemplary embodiment of the present invention.

Hereinafter, exemplary embodiments of the present invention will be described in detail with reference to the accompanying drawings. Throughout the specification, the same reference numerals indicate substantially the same components. In describing the present invention, when it is deemed that a detailed description of known functions or configurations may unnecessarily obscure the subject matter of the present invention, the detailed description will be omitted.

[Touch Sensing System]

FIG. 1 shows a touch sensing system according to an exemplary embodiment of the present invention.

Referring to FIG. 1, a touch sensing system according to the present invention comprises a display device 100 and a stylus pen 200.

The display device 100 has both a display function and a touch sensing function. The display device 100 has a built-in capacitive touchscreen that can sense touch when a finger or a conductive object such as the stylus pen 200 hovers over or touches it. Here, the touchscreen may be built separate from a display panel, or be embedded in a pixel array on the display panel. The construction and operation of the display device 100 will be described later with reference to FIGS. 2 through 6.

The stylus pen 200 facilitates touch position detection on the touchscreen by generating and outputting a pen driving signal at a point where it hovers over or touches the touchscreen. The stylus pen 200 receives a touchscreen driving signal from the touchscreen, generates a pen driving signal based on the touchscreen driving signal, and then applies it to the touchscreen. The construction and operation of the stylus pen 200 will be described below with reference to FIGS. 7 through 12.

In order to get a desired touch sensing signal, the pen driving signal is applied to the touchscreen after it is precisely synchronized with the touchscreen driving signal. FIGS. 13 through 18 propose a construction and method that allows for synchronization between the pen driving signal with the touchscreen driving signal.

[Display Device]

Figure 2:
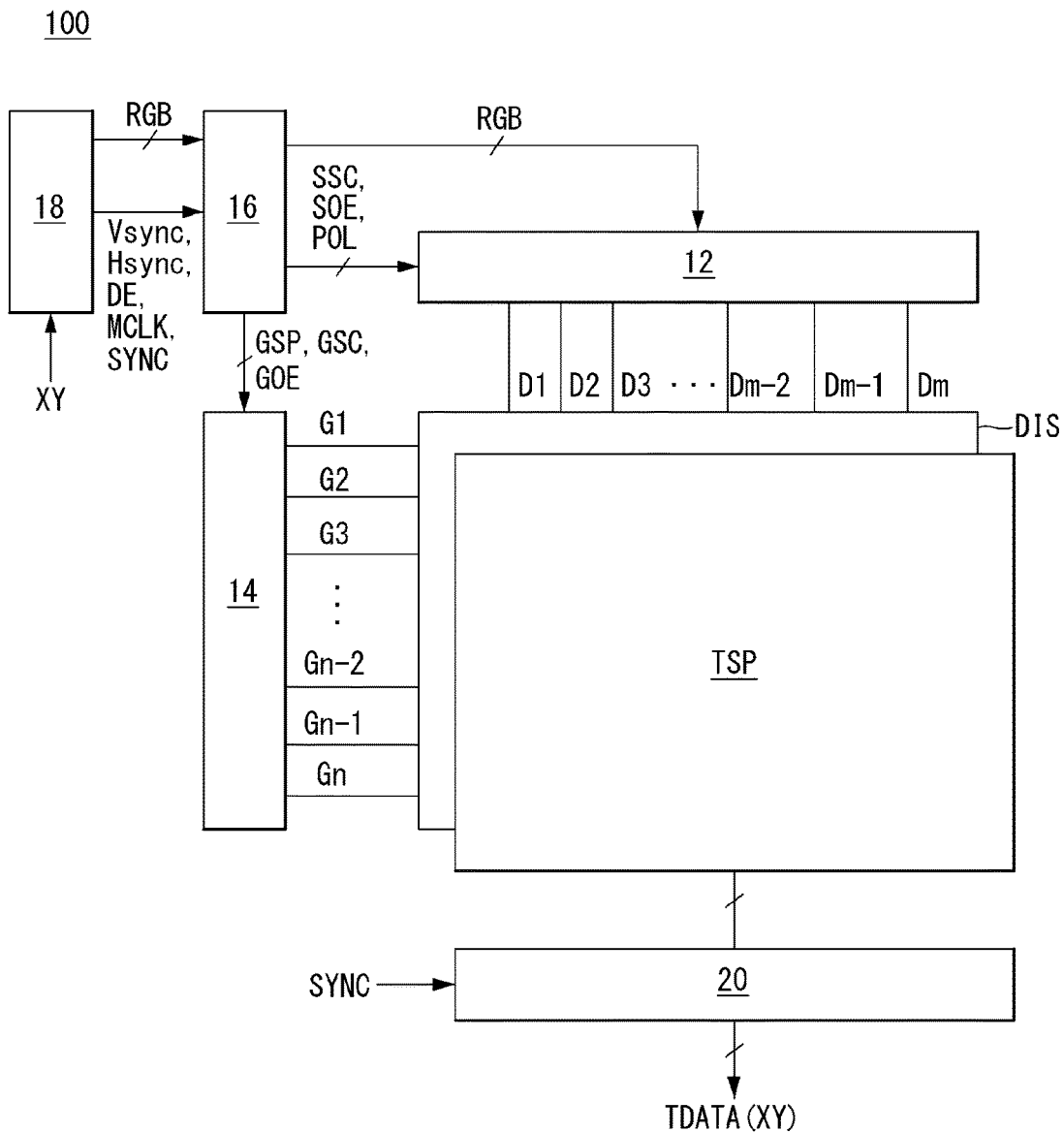
FIG. 2 shows a display device to which a touch sensing system is applied according to an exemplary embodiment of the present invention.
Figure 3:
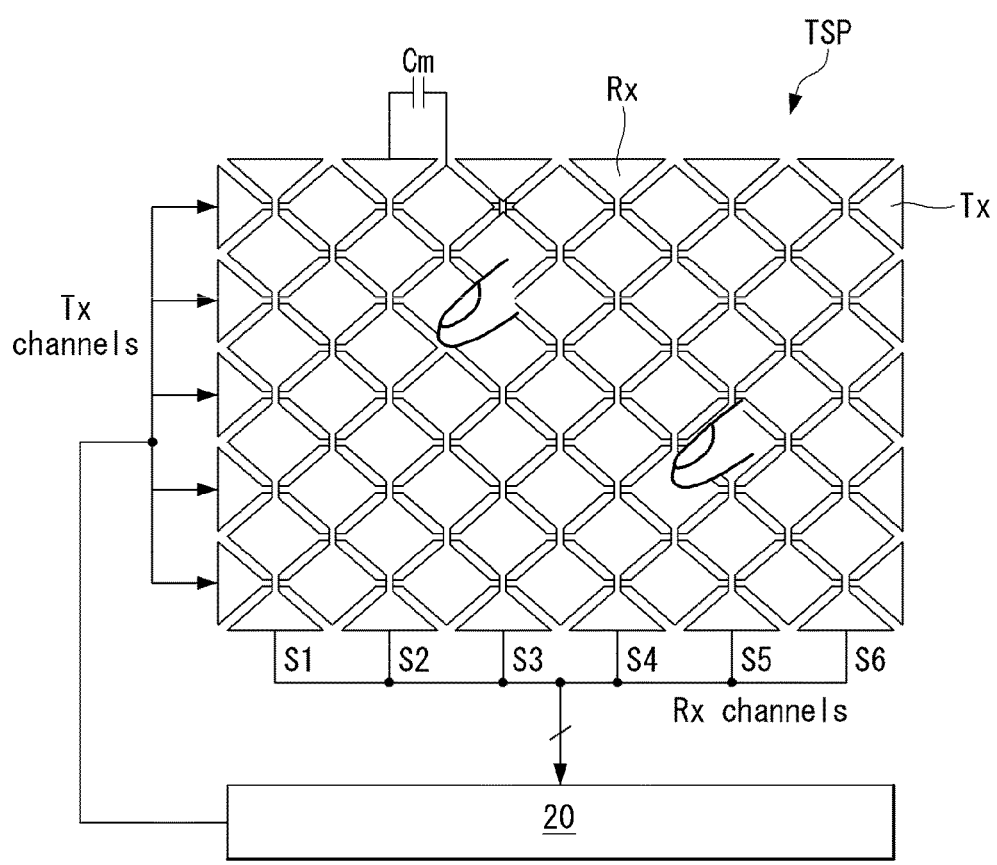
FIG. 3 shows an example of a touchscreen that is implemented by mutual capacitance sensors.
Figure 4:
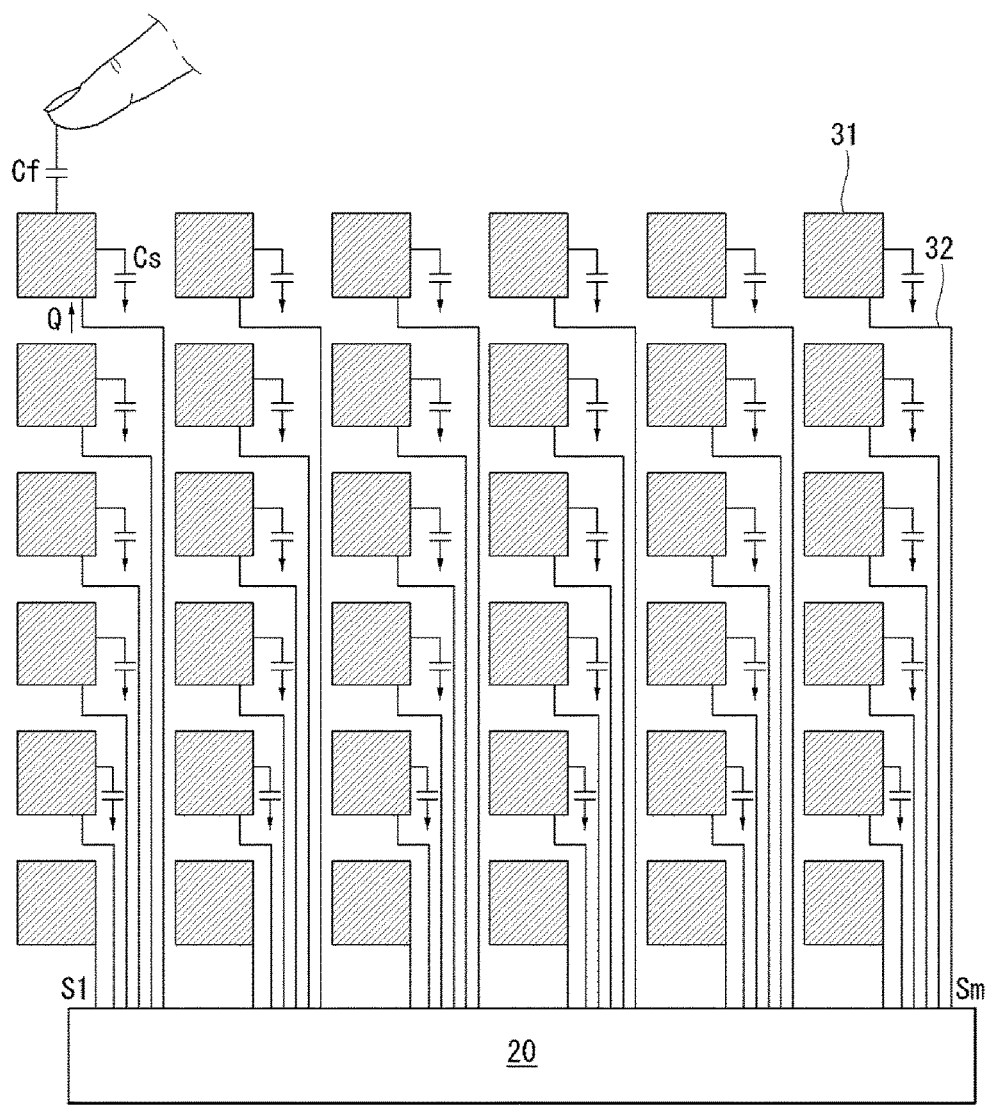
FIG. 4 shows an example of a touchscreen that is implemented by self-capacitance sensors.
Figure 5:
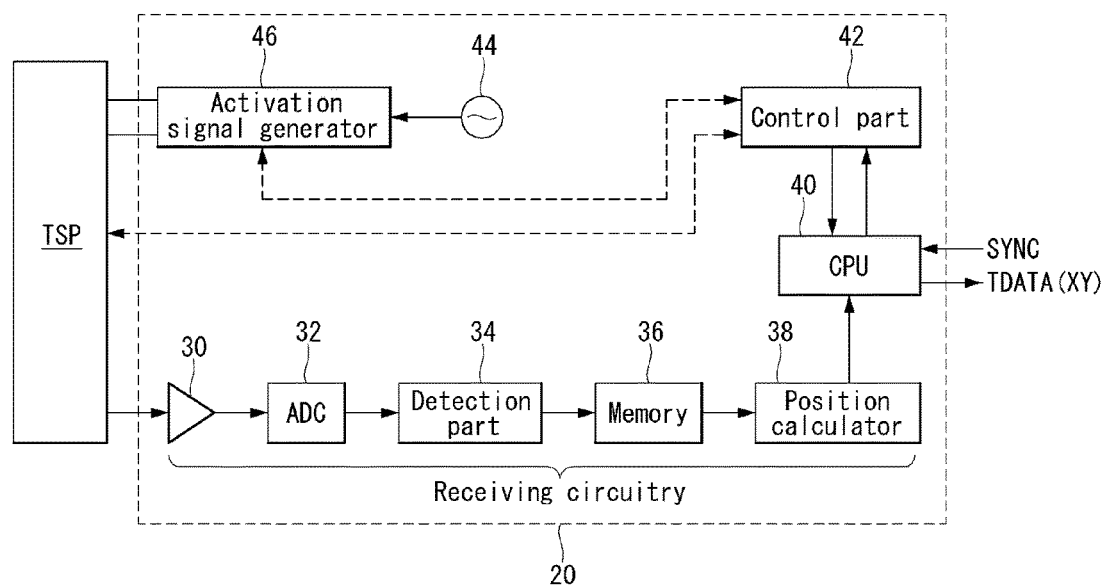
FIG. 5 shows the detailed construction of a touch IC.

FIG. 2 shows a display device to which a touch sensing system is applied according to an exemplary embodiment of the present invention. FIG. 3 shows an example of a touchscreen that is implemented by mutual capacitance sensors. FIG. 4 shows an example of a touchscreen that is implemented by self-capacitance sensors. FIG. 5 shows the detailed construction of a touch IC.

Referring to FIGS. 1 through 5, a touch sensing system according to the present invention comprises a display device 100 and a stylus pen 200.

The display device 100 may be implemented on the basis of a flat-panel display device such as a liquid crystal display (LCD), a field emission display (FED), a plasma display panel (PDP), an organic light-emitting display (OLED), an electrophoretic display (EPD), etc. Although the following exemplary embodiment illustrates that the display device is implemented as a liquid crystal display, the display device of this invention is not limited thereto.

The display device 100 has a display module and a touch module.

The touch module comprises a touchscreen TSP and a touch IC 20.

The touchscreen TSP may be implemented as a capacitive touchscreen that senses touch input by a plurality of capacitive sensors. The touchscreen TSP comprise a plurality of touch sensors with capacitance. There are two types of capacitance: self-capacitance and mutual capacitance. Self-capacitance may occur along a single layer of conductive wires oriented in one direction, and mutual capacitance may occur between two conductive wires orthogonal to each other.

The touchscreen TSP implemented using mutual capacitance sensors Cm may comprise, as shown in FIG. 3, Tx electrode lines, Rx electrode lines intersecting the Tx electrode lines, and touch sensors Cm formed at the intersections of the Tx electrode lines and the Rx electrode lines. The Tx electrode lines are driving signal lines that apply a touchscreen driving signal to the touch sensors Cm to provide a charge to the touch sensors Cm. The Rx electrode lines are sensor lines that are connected to the touch sensors Cm to provide the charge in the touch sensors Cm to the touch IC 20. In mutual capacitive sensing, touch input can be sensed by applying an driving signal to the Tx electrodes via the Tx electrode lines to provide a charge to the touch sensors Cm and then sensing a capacitance change via the Rx electrodes and the Rx electrode lines, in synchronization with the touchscreen driving signal.

The touchscreen TSP implemented using self-capacitance sensors Cs may have touch electrodes 31 connected on a one-to-one basis to sensor lines 32 oriented in one direction, as shown in FIG. 4. The mutual capacitance sensors Cs comprise capacitance formed at each of the electrodes 31. In self-capacitance sensing, when an driving signal is applied to the electrodes 31 via the sensor lines 32, a charge Q is stored in the touch sensors Cs. In this case, when a finger or conductive object touches an electrode 31, parasitic capacitance Cf is additionally connected to the self-capacitance sensor Cs, and the capacitance of the sensor changes. This creates a change in capacitance between the touched sensor and the untouched sensors, whereby it is possible to detect the presence of a touch.

The touchscreen TSP may be bonded onto an upper polarizer of a display panel DIS, or be formed between the upper polarizer of the display panel DIS and an upper substrate. Also, the touch sensors Cm or Cs on the touchscreen TSP may be embedded in the pixel array on the display panel DIS.

The touch IC 20 detects a touch from a conductive object such as a finger (or stylus pen) and the touch position by sensing a change in the amount of electrical charge in the touch sensor before and after the touch. The touch IC 20 comprises receiving circuitry, a CPU 40, a control part 42, and an driving signal generator 46.

The receiving circuitry is connected to receiving channels (Rx channels of FIG. 3 or S1 to Sm of FIG. 4) on the touchscreen TSP. The receiving circuitry comprise a receiving amp 30 that senses touch (hovering) input from the receiving channels, an analog-to-digital converter (ADC) 32 that converts an analog sensing signal from the receiving amp 30 to a digital sensing signal, a detector 34 that removes noise components from the digital sensing signal from the analog-to-digital converter (ADC) 32, a memory 36 that stores a sensing signal input from the detector 34, and a position calculator 38 that compares the sensing signal stored in the memory 36 with a predetermined threshold and derives the sensing signal as a touch input position sensing signal if the sensing signal is greater than the threshold.

The CPU 40 calculates coordinate data TDATA(XY) on a touch (hovering) position by applying the sensing signal from the position calculator 38 to a preset coordinate extraction algorithm. Then, the CPU 40 transmits the calculated coordinate data TDATA(XY) to a host system 18. The CPU 40 may receive a touch operation synchronization signal SYNC from the host system 18 and passes it to the control part 42.

The control part 42 controls the overall operation of the touch module based on the touch operation synchronization signal SYNC.

The driving signal generator 46 is connected to a power supply 44 to receive operating power. The driving signal generator 46 generates a touchscreen driving signal under control of the control part 42 and applies it to the touch sensors via transmitting channels (Tx channels of FIG. 3 or S1 to Sm of FIG. 4) on the touchscreen TSP. The touchscreen driving signal may be generated in various forms such as a square-wave pulse, a sine wave, a chopping wave, etc., preferably, a square-wave pulse. The touchscreen driving signal may be applied N times to the touch sensors so that charge is accumulated in the receiving amp 30 N or more times (N is a natural number equal to or greater than 2), The display module may comprise the display panel DIS, display drive circuits 12, 14, and 16, and the host system 18.

The display panel DIS comprises a liquid crystal layer formed between two substrates. The pixel array on the display panel DIS comprises pixels that are formed in pixel regions defined by data lines D1 to Dm (m is positive integer) and gate lines G1 to Gn (n is a positive integer). Each pixel may comprise TFTs (thin film transistors) formed at the intersections of the data lines D1 to Dm and the gate lines G1 to Gn, a pixel electrode that is charged with a data voltage, and a storage capacitor Cst connected to the pixel electrode to hold the voltage across the liquid crystal cell.

On the upper substrate of the display panel DIS, a black matrix, color filters, etc. may be formed. The lower substrate of the display panel DIS may be implemented in a COT (color filter on TFT) structure. In this case, the black matrix and the color filters may be formed on the upper or lower substrate of the display panel DIS. A common electrode to be supplied with a common voltage may be formed on the upper or lower substrate of the display panel DIS. Polarizers are respectively attached to the upper and lower substrates of the display panel DIS, and an alignment film for setting a pre-tilt angle of liquid crystals is formed on an inner surface contacting the liquid crystals. A column spacer for maintaining a liquid crystal cell gap is formed between the upper and lower substrates of the display panel DIS.

A backlight unit may be disposed under the back of the display panel DIS. The backlight unit is an edge-type or direct-type backlight unit which illuminates the display panel DIS. The display panel DIS may be implemented in any well-known liquid crystal mode, such as a TN (Twisted Nematic) mode, a VA (Vertical Alignment) mode, an IPS (In-Plane Switching) mode, and an FFS (Fringe Field Switching) mode.

The display drive circuits comprise a data drive circuit 12, a scan drive circuit 14, and a timing controller 16, and write video data of an input image to the pixels of the display panel DIS. The data drive circuit 12 converts digital video data RGB input from the timing controller 16 to an analog positive/negative gamma compensation voltage to output a data voltage. The data voltage output from the data drive circuit 12 is supplied to the data lines D1 to Dm. The scan drive circuit 14 sequentially supplies a gate pulse (or scan pulse) synchronized with the data voltage to the gate lines G1 to Gn to select pixel lines of the display panel DIS to which the data voltage is written.

The timing controller 16 receives timing signals such as a vertical synchronization signal Vsync, horizontal synchronization signal Hsync, data enable signal DE, main clock MCLK, etc. input from the host system 18, and synchronizes the operation timings of the data drive circuit 12 and scan drive circuit 14. Scan timing control signals include a gate start pulse (GSP), a gate shift clock, a gate output enable (GOE) signal, etc. Data timing control signals include a source sampling clock SSC, a polarity control signal POL, a source output enable signal SOE, etc.

The host system 18 may be implemented as any one of the following: a television system, a set-top box, a navigation system, a DVD player, a Blue-ray player, a personal computer PC, a home theater system, and a phone system. The host system 18 comprises a system-on-chip (SoC) having a scaler incorporated therein, and converts digital video data RGB of an input image into a format suitable for display on the display panel DIS. The host system 18 transmits the timing signals Vsync, Hsync, DE, and MCLK, along with the digital video data, to the timing controller 16. Further, the host system 18 transmits a touch operation synchronization signal SYNC to the touch IC 20, and executes an application associated with touch coordinate data XY input from the touch IC 20.

Figure 6:
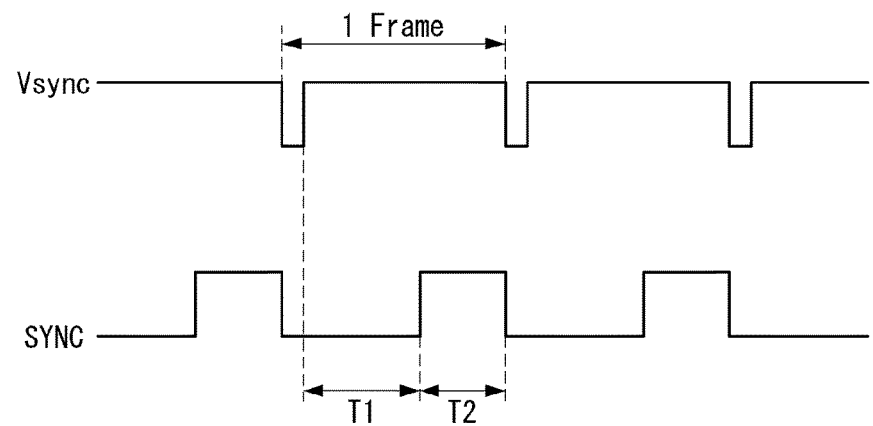
FIG. 6 is a view showing that 1 frame is divided into a display driving period and a touch sensor driving period.

As shown in FIG. 6, the host system 18 may divide 1 frame into a display driving period T1 and a touch sensor driving period T2 with reference to the vertical synchronization signal Vsync and the touch operation synchronization signal SYNC. Display noise may be mixed in with a touch sensing signal, and the amount of noise increases especially if the touch sensors in the touchscreen TSP are embedded in the pixel array on the display panel DIS. The time-division driving is useful to reduce the effect of noise and improve the accuracy of touch sensing.

The host system 18 generates the touch operation synchronization signal SYNC based on the vertical synchronization signal Vsync, and then sends it to the timing controller 16 and the touch IC 20. Alternatively, the touch operation synchronization signal SYNC may be generated by the timing controller 16.

During the display driving period T1, the data drive circuit 12 supplies a data voltage to the data lines D1 to Dn under control of the timing controller 16, and the scan drive circuit 14 sequentially supplies a gate pulse synchronized with the data voltage to the gate lines G1 to Gn under control of the timing controller 16. Meanwhile, the touch IC 20 stops operating during the display driving period T1.

During the touch sensor driving period T2, the touch IC 20 applies a touchscreen driving signal to the touch sensors in the touchscreen TSP to sense a touch (or hovering) position. Meanwhile, during the touch sensor driving period T2, the display drive circuits 12, 14, and 16 may supply an alternating current signal with the same amplitude and phase as the touchscreen driving signal to the signal lines D1 to Dm and G1 to Gn connected to the pixels. In this case, display noise mixed in with the touch sensing signal can be significantly reduced, thereby greatly improving the accuracy of touch sensing.

[Stylus Pen]

Figure 7:
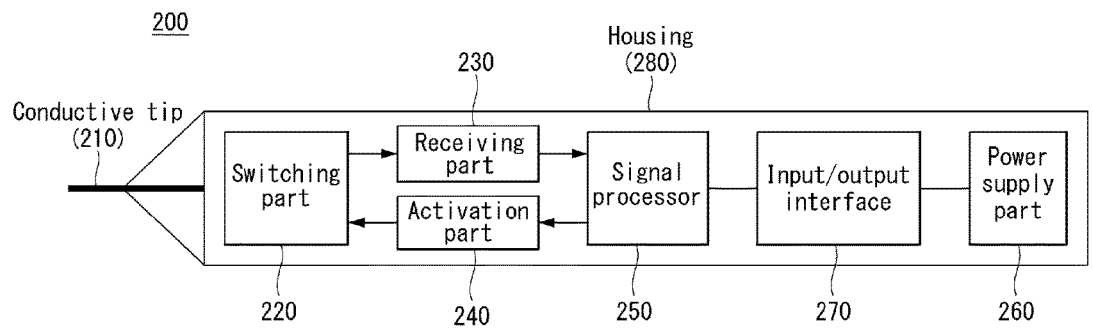
FIG. 7 shows the internal construction of a stylus pen according to an exemplary embodiment of the present invention.

FIG. 7 shows the internal construction of a stylus pen 200 according to an exemplary embodiment of the present invention.

Referring to FIG. 7, the stylus pen 200 comprises a housing 280, a conductive tip 210 protruding outward from one side of the housing 280, a switching part 220 connected to the conductive tip 210 within the housing 280, a receiving part 230 that receives a touchscreen driving signal input from the conductive tip 210 via the switching part 220, a signal processor 250 that generates a pen driving signal based on the touchscreen driving signal from the receiving part 230, in synchronization with the touchscreen driving signal, an driving part 240 that shifts the voltage level of the pen driving signal generated by the signal processor 250 and then supplies it to the conductive tip 210 via the switching part 220, a power supply part 260 that generates operating power required for operation, and an input/output interface 270.

The conductive tip 210 is made from a conductive material such as metal, and serves as a receiving electrode and a transmitting electrode. When the conductive tip 210 touches or hovers over the touchscreen TSP of the display device 200, the conductive tip 210 is coupled to the touchscreen TSP at the contact (or hovering) point. The conductive tip 210 receives a touchscreen driving signal from the touchscreen TSP at the contact (or hovering) point, and then sends a pen driving signal, which is generated by the stylus pen 200 in synchronization with the touchscreen driving signal, to the point where it touches (or hovers over) the touchscreen TSP.

When the conductive tip 210 touches or hovers over the touchscreen TSP of the display device 200, the switching part 220 temporally separates the reception timing of the touchscreen driving signal and the transmission timing of the pen driving signal by electrically connecting the conductive tip 210 and the receiving part 230 during one period of time and electrically connecting the conductive tip 210 and the driving part 240 during another period of time. The stylus pen 200 may have a simple structure since the conductive tip 210 serves as both a receiving electrode and a transmitting electrode.

The receiving part 230 may comprise at least one amplifier to amplify the touchscreen driving signal input from the conductive tip 210 via the switching part 220. The receiving part 230 comprises a comparator to compare an amplified signal with a preset reference voltage and outputs the result to the signal processor 250.

The signal processor 250 analyzes the comparator output signal input from the receiving part 230 for at least one frame, and generates the pen driving signal in synchronization with the touchscreen driving signal and outputs it to the driving part 240.

The driving part 240 comprises a level shifter to adjust the voltage level of the pen driving signal to that of the touchscreen driving signal. The driving part 240 outputs the level-shifted pen driving signal to the conductive tip 210 via the switching part 220.

The input/output interface 270 is connected to the power supply part 260 when depressed by the user, and supplies power required for the receiving part 230, driving part 240, and signal processor 250.

Figure 8:
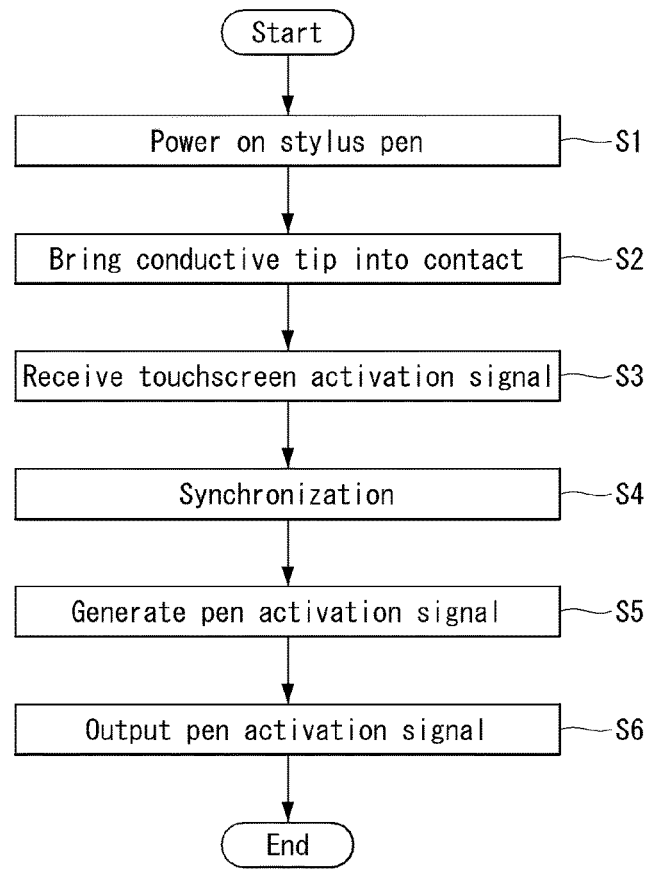
FIG. 8 shows the operational sequence of the stylus pen according to an exemplary embodiment of the present invention.

FIG. 8 shows the operational sequence of the stylus pen 200 according to an exemplary embodiment of the present invention.

Referring to FIG. 8, the conductive tip 210 is brought into contact with (or hovered over) a predetermined point on the touchscreen TSP while power is being applied through the input/output interface 270 and the power supply part 260 (S1 and S2).

During the touch sensor driving period, a touchscreen activating signal is supplied to each touch sensor in the touchscreen TSP. The conductive tip 210 is coupled to the touchscreen TSP immediately upon touching it, and senses the touchscreen activating signal received from a touch electrode in the touchscreen TSP and transmits the sensed signal to the receiving part 230. The receiving part 230 amplifies the touchscreen activating signal by using an internal amplifier, and compares the amplified signal with a reference voltage by using an internal comparator and outputs the result to the signal processor 250 (S3).

The signal processor 250 analyzes the comparator output signal input from the receiving part 230 to determine the timing for synchronization with the touchscreen driving signal, and then generates a pen driving signal in synchronization with the touchscreen driving signal and outputs it to the driving part 240. More specifically, the signal processor 250 measures the pulse width of the comparator output signal, adjusts the amount of delay based on the measurement, and determines the output timing of the pen driving signal based on the adjusted amount of delay to synchronize the pen driving signal with the touchscreen driving signal. In this case, the signal processor 250 decides to output the pen driving signal after the adjusted amount of delay from the rising or falling edge of the comparator output signal. Here, the amount of delay refers to an offset value used to synchronize the pen driving signal with the touchscreen signal driving signal. By adjusting the amount of delay based on the pulse width of the comparator output signal, the synchronization timing can be kept constant even if the strength of the comparator input signal (the signal amplified by the amplifier) changes depending on the amount of external noise or hovering (S4 and S5). This will be described in detail with reference to FIGS. 15 through 19. The process of determining the synchronization timing may be usually performed based on accumulated data on the comparator output signal for at least 1 frame. This is to precisely synchronize the touchscreen driving signal and the pen driving signal.

The driving part 240 has a level shifter to adjust the voltage level of the pen driving signal to that of the touchscreen driving signal and then output the level-shifted pen driving signal to the conductive tip 210 via the switching part 220. The conductive tip 210 applies the pen driving signal to the point where it touches (or hovers over) the touchscreen (S6).

Figure 9:
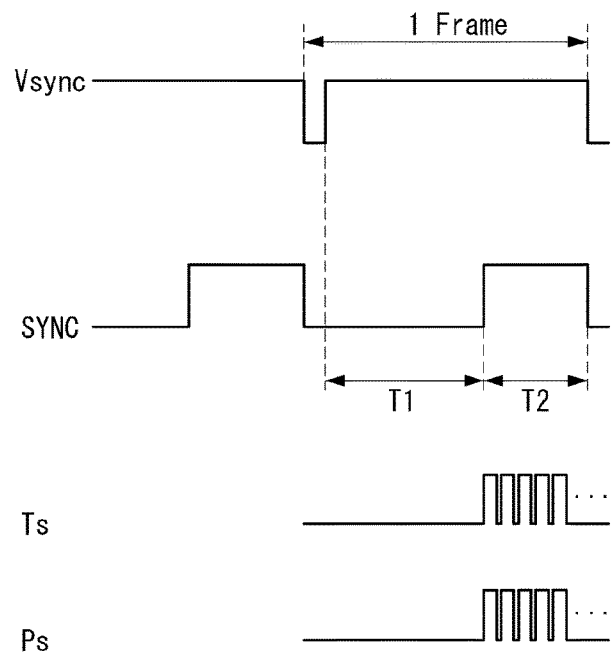
FIG. 9 shows that a touchscreen driving signal and a pen driving signal are synchronized with each other within a touch sensor driving period.
Figure 10:
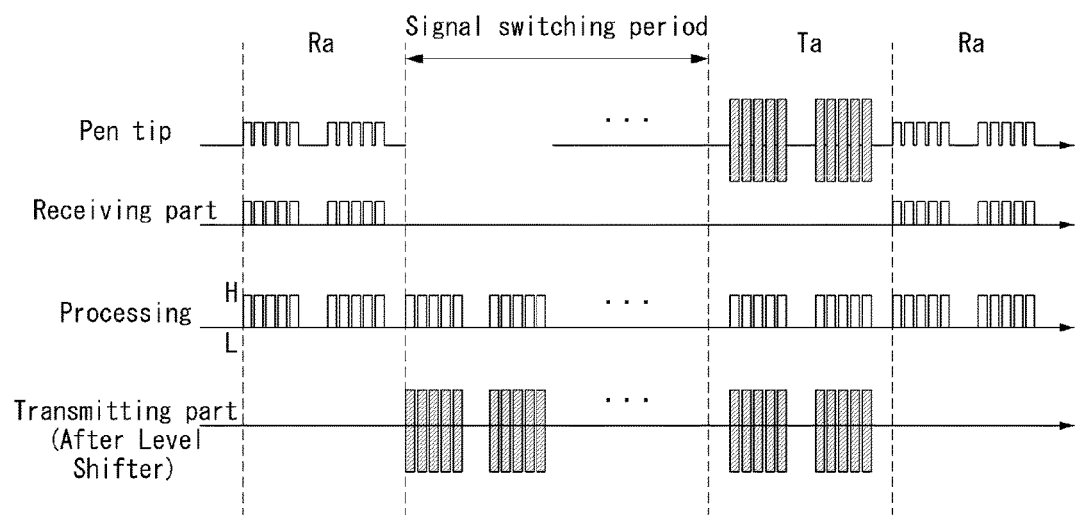
FIG. 10 shows the waveforms of signals received and processed by the stylus pen of FIG. 7.

FIG. 9 shows that a touchscreen driving signal and a pen driving signal are synchronized with each other within a touch sensor driving period T2. FIG. 10 shows the waveforms of signals received and processed by the stylus pen of FIG. 7.

Referring to FIGS. 9 and 10, subsequent to the initial ON operation of the stylus pen 200, the stylus pen 200 touches the touchscreen TSP, and then at least 1 frame of a signal switching period is provided between the reception period Ra of a touchscreen driving signal Ts and the transmission period Ta of a pen driving signal Ps to ensure operation stability. The signal processor 250 determines the synchronization timing using the signal switching period and generates the pen driving signal Ps at the synchronization timing.

In subsequent frames, the transmission Ta of the pen driving signal Ps synchronized with the touchscreen driving signal Ts to the touchscreen TSP via the conductive tip 310 and the reception Ra of the touchscreen driving signal Ts via the conductive tip 210 occur alternately. After the initial synchronization between the pen driving signal Ps and the touchscreen driving signal Ts, the signal switching period may be omitted.

FIG. 10 illustrates that the reception period Ra of the touchscreen driving signal Ts and the transmission period Ta of the pen driving signal Ps are of equal length. But practically speaking, the better the shorter the length of the reception period because it is associated with touch response rate, and the length of the transmission period Ta is relatively longer than that of the reception period Ra.

Figure 11:
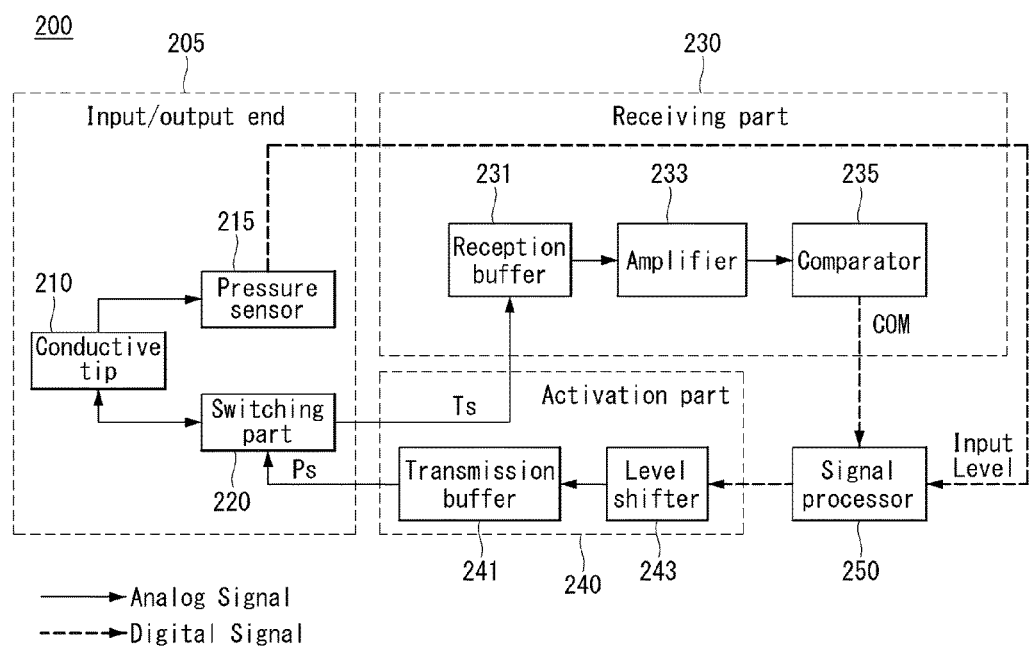
FIG. 11 shows in more detail the internal construction of the stylus pen of FIG. 7.

FIG. 11 shows in more detail the internal construction of the stylus pen 200 of FIG. 7.

Referring to FIG. 11, the input/output end 205 of the stylus pen 200 may further comprise a pressure sensor 215, in addition to the conductive tip 210 and the switching part 220. The pressure sensor 215 senses a pressure on the touchscreen TSP from the stylus pen 200 and transmits the sensed pressure level to the signal processor 250. The signal processor 250 may vary the pen driving signal Ps depending on the sensed pressure level, and can therefore improve the sensitivity of the stylus pen 200 when a touch event occurs.

The receiving part 230 of the stylus pen 200 comprises a reception buffer 231, an amplifier 233, and a comparator 235. The reception buffer 231 receives a touchscreen driving signal Ts transmitted via the switching part 220 and applies it to the amplifier 233. The amplifier 233 consists of at least two stages and amplifies a touchscreen driving signal Ts of analog level to improve received signal sensitivity. The comparator 235 compares the amplified signal with an internal reference voltage and generates a comparator output signal COM of digital level for voltages higher or lower than the reference voltage. Here, if the amplifier 233 is an inverting amplifier, the comparator 235 may use a comparator output signal COM with a voltage higher than the reference voltage, whereas, if the amplifier 233 is a non-inverting amplifier, the comparator 235 may use a comparator output signal COM with a voltage lower than the reference voltage.

As described previously, the signal processor 250 of the stylus pen 200 determines the timing for synchronization with the touchscreen driving signal Ts based on the comparator output signal COM, and then generates a pen driving signal Ps of digital level at the synchronization timing.

Figure 17:
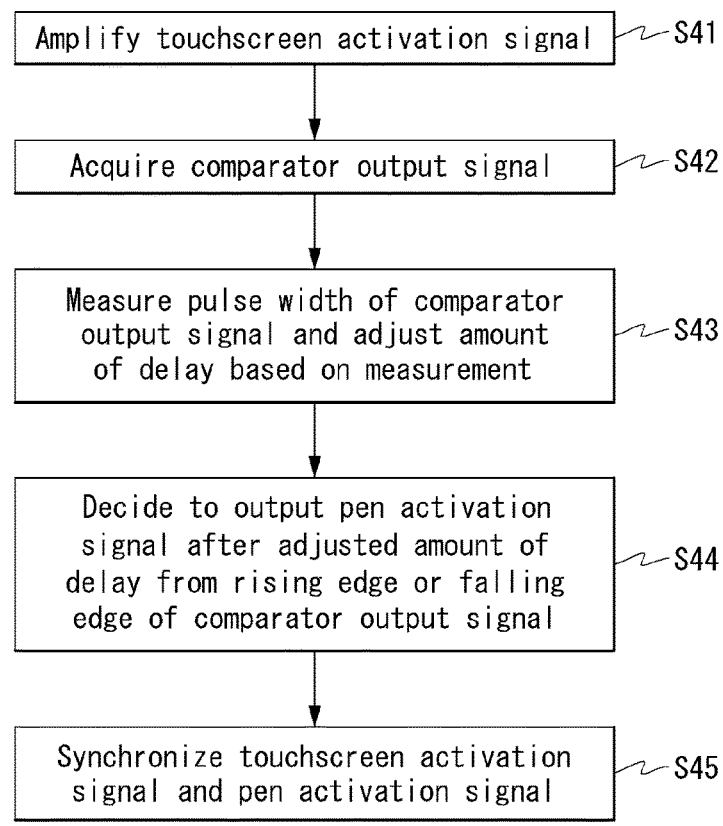

The driving part 240 of the stylus pen 200 shifts the voltage level of the pen driving signal Ps (from A1 to A2 as shown in FIG. 17) by the level shifter 243, and then outputs the level-shifted pen driving signal Ps to the switching part 220 through a transmission buffer 241. Then, the switching part 220 passes the pen driving signal Ps to the conductive tip 210.

Figure 12:
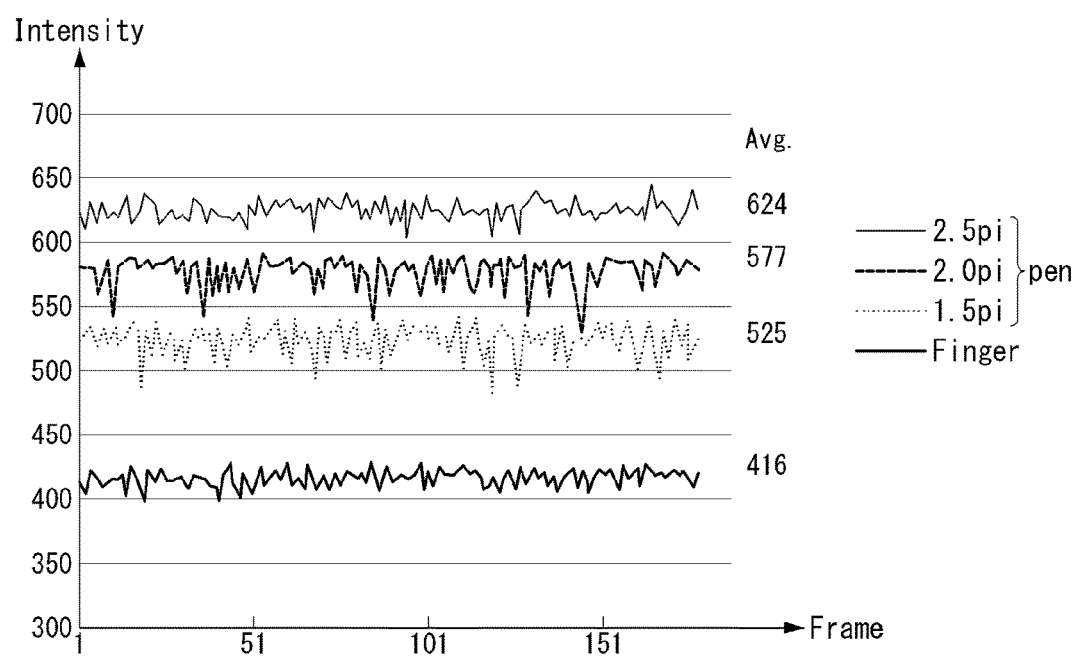
FIG. 12 is a simulation result showing improvements in sensitivity to touch sensing signals when the stylus pen touches the touchscreen, compared to when a finger touches the touchscreen.

FIG. 12 is a simulation result showing improvements in sensitivity to touch sensing signals when the stylus pen touches the touchscreen, compared to when a finger touches the touchscreen.

Referring to FIG. 12, the applicant of the present invention conducted a test that measures the strength of touch sensing signals of when the stylus pen touches the touchscreen and when a finger touches the touchscreen. The test results showed that the strength of the sensing signals was higher when the stylus pen touches the touchscreen, compared to when the finger touches the touchscreen, and that the larger the capacitance between the touchscreen and conductive tip coupled to each other, the greater the strength of the sensing signals.

The touch sensing system of this invention offers the advantage of improving the strength of touch sensing signals by comprising an active stylus pen that generates a pen driving signal in synchronization with a touchscreen driving signal and applies it to the touchscreen.

[Method of Synchronization]

Figure 13A:
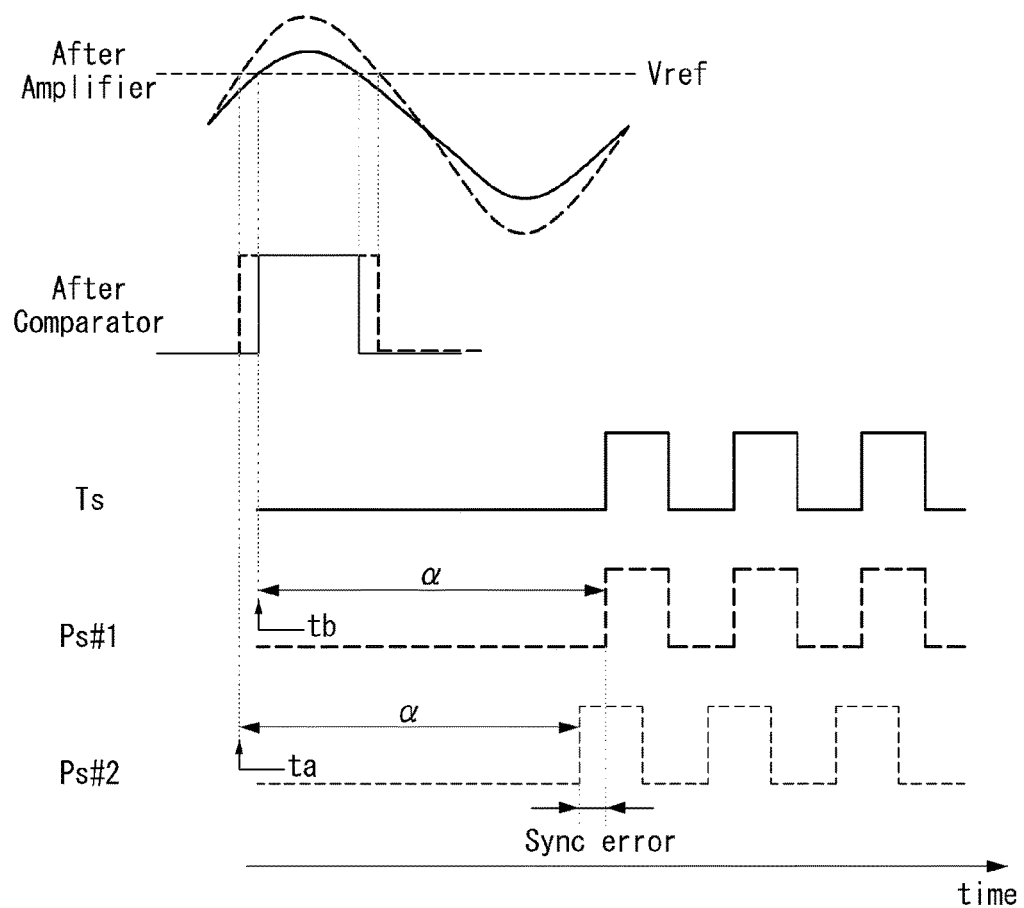
FIGS. 13A and 13B show an example in which the synchronization between the touchscreen driving signal and the pen driving signal is distorted depending on the proximity between the stylus pen and the touchscreen.
Figure 13B:
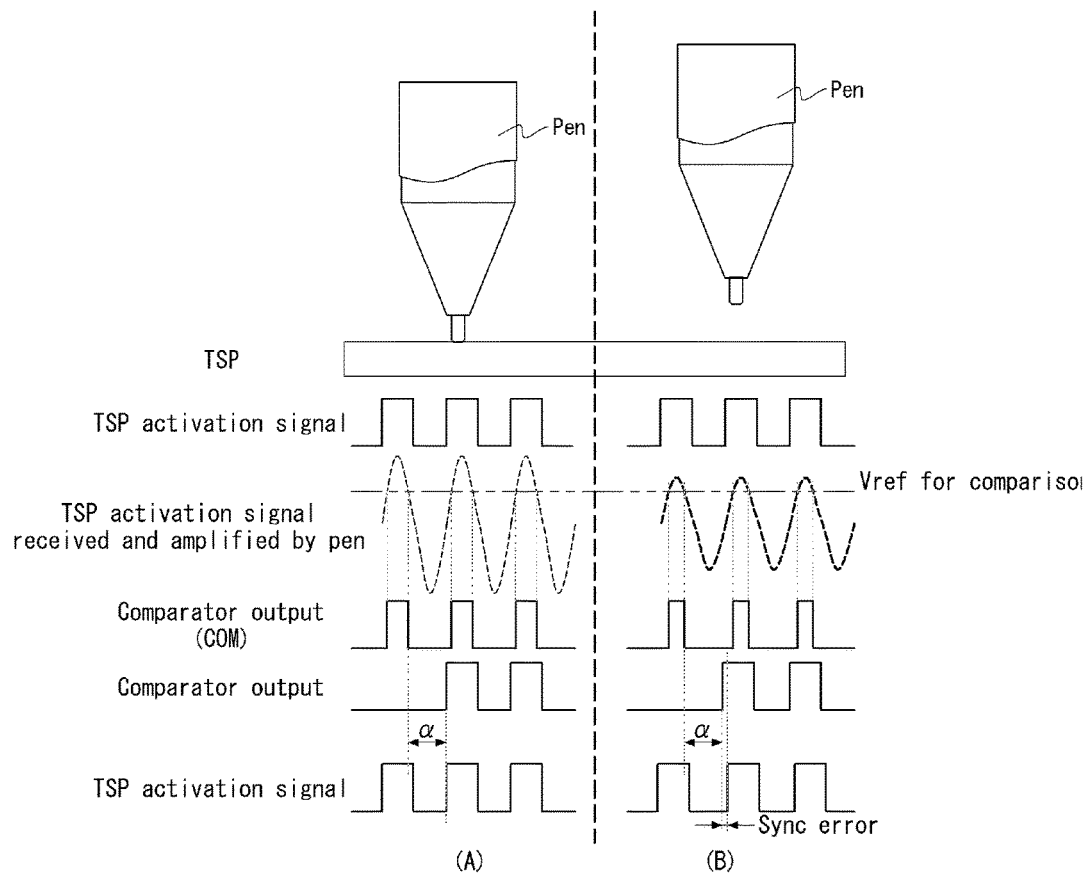
Figure 14:
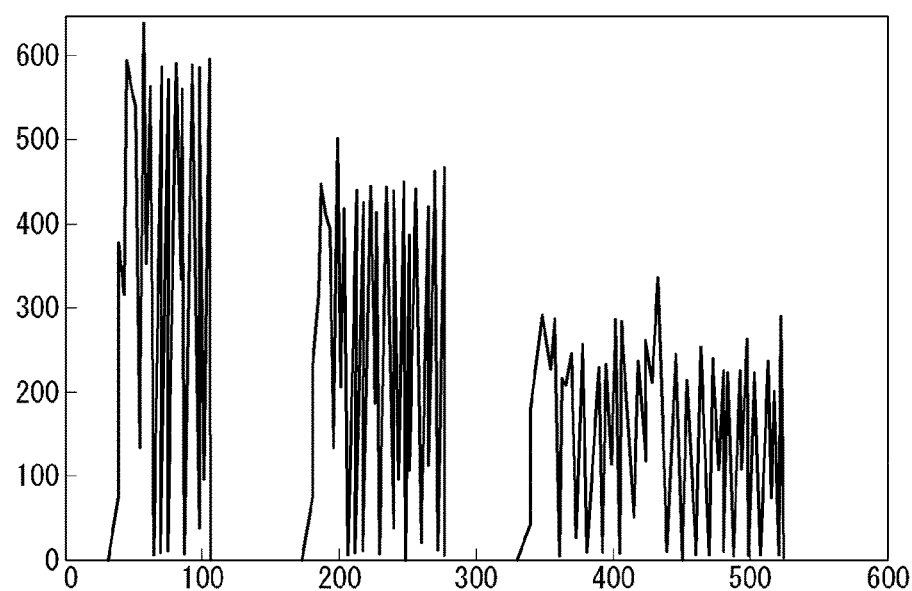
FIG. 14 shows the strength of touch sensing signals vs. the degree of synchronization in a touch sensing system using a stylus pen.

FIGS. 13A and 13B show an example in which the synchronization between the touchscreen driving signal and the pen driving signal is distorted depending on the proximity between the stylus pen and the touchscreen. FIG. 14 shows the strength of touch sensing signals vs. the degree of synchronization in a touch sensing system using a stylus pen.

As described previously, the signal processor 250 of the stylus pen 200 determines the timing for synchronization with the touchscreen driving signal Ts based on the comparator output signal COM, and then generates a pen driving signal Ps of digital level at the synchronization timing.

However, as shown in FIGS. 13A and 13B, the strength of the touchscreen driving signal received by the stylus pen changes depending on the proximity between the touchscreen and the stylus pen. The strength of the touchscreen driving signal is smaller when the stylus pen touches the touchscreen (as indicated by the dotted line waveform), compared to when the stylus pen hovers over the touchscreen (as indicated by the solid line waveform). Moreover, the strength of the touchscreen driving signal is even smaller when the hover distance is long, compared to when the hover distance is short. In the case that the comparator 235 of the stylus pen 200 generate comparator output signals at a fixed reference voltage, that is, a first comparator output signal (as indicated by the dotted line waveform of FIG. 13A and in (A) of FIG. 13B) of when touching the touchscreen and a second comparator output signal (as indicated by the solid line waveform of FIG. 13A and in (B) of FIG. 13B) of when hovering, the first and second comparator output signals have different pulse widths.

In this case, the signal processor 250 decides to perform synchronization after a fixed amount of delay from the rising or falling edge of a comparator output signal, and this leads to an inevitable variation in synchronization timing depending on the proximity between the touchscreen and the stylus pen. For example, in the case that pen driving signals are generated after a fixed amount α of delay from the rising or falling edge of comparator output signals, as shown in FIGS. 13A and 13B, this creates a phase difference between a first pen driving signal Ps#1 and a second pen driving signal Ps#2, which is equal to the phase difference ta–tb between the first comparator output signal (as indicated by the dotted line waveform) and the second comparator output signal (as indicated by the solid line waveform). If the first pen driving signal Ps#1 is in synchronization with the touchscreen driving signal Ts, the synchronization between the second pen driving signal Ps#2 and the touchscreen driving signal Ts is distorted by the phase difference.

In the case that the signal processor 250 decides to perform synchronization after a fixed amount of delay from the rising or falling edge of a comparator output signal, the synchronization timing varies each time the proximity between the touchscreen and the stylus pen changes or each time the strength of a touchscreen driving signal received by the stylus pen changes due to external noise. The variation in synchronization timing creates a synchronization error between the touchscreen driving signal Ts and the pen driving signal Ps, and therefore the strength of touch sensing signals is not kept constant but decreases under the same condition (the touchscreen is touched or untouched), as shown in FIG. 14. If the strength of touch sensing signals is not kept constant under the same condition (the touchscreen is touched or untouched), an untouched point may be misperceived as a touched point, or vice versa.

Figure 18:
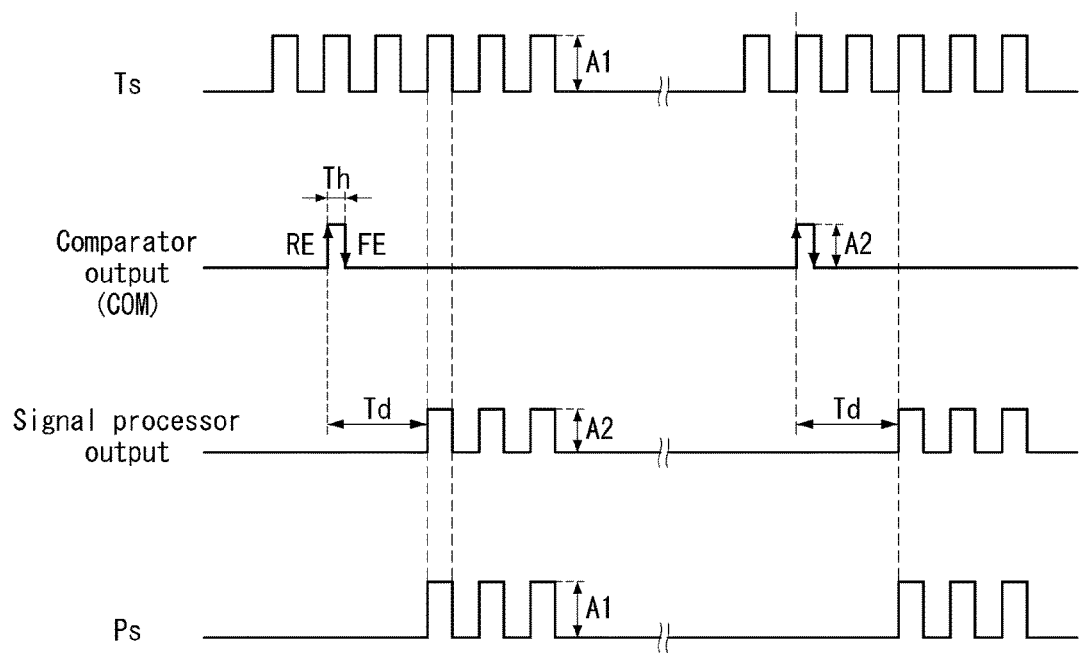
Figure 19:
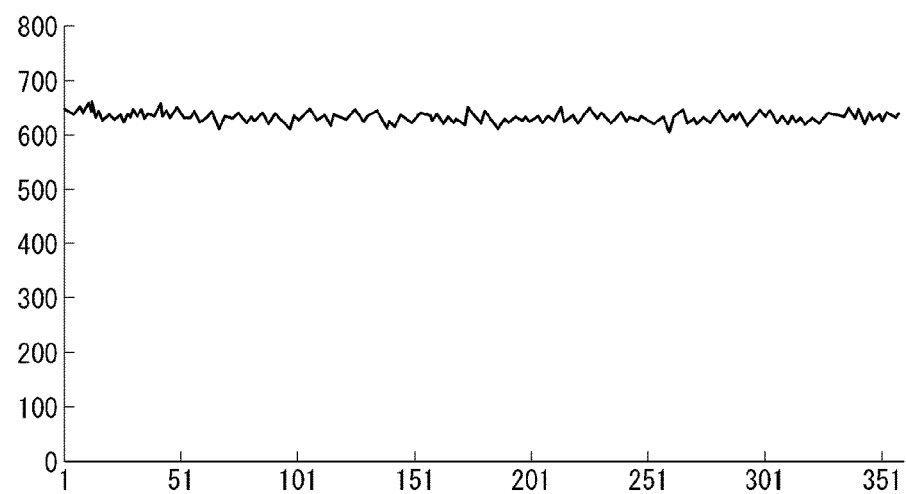
FIG. 19 shows the strength of touch sensing signals vs. proximity when the method of synchronization of FIG. 18 is used.

FIGS. 15 through 18 show a method of precise synchronization between the pen driving signal and the touchscreen driving signal regardless of the proximity between the stylus pen and the touchscreen. FIG. 19 shows the strength of touch sensing signals vs. proximity when the method of synchronization of FIG. 18 is used.

Figure 15:
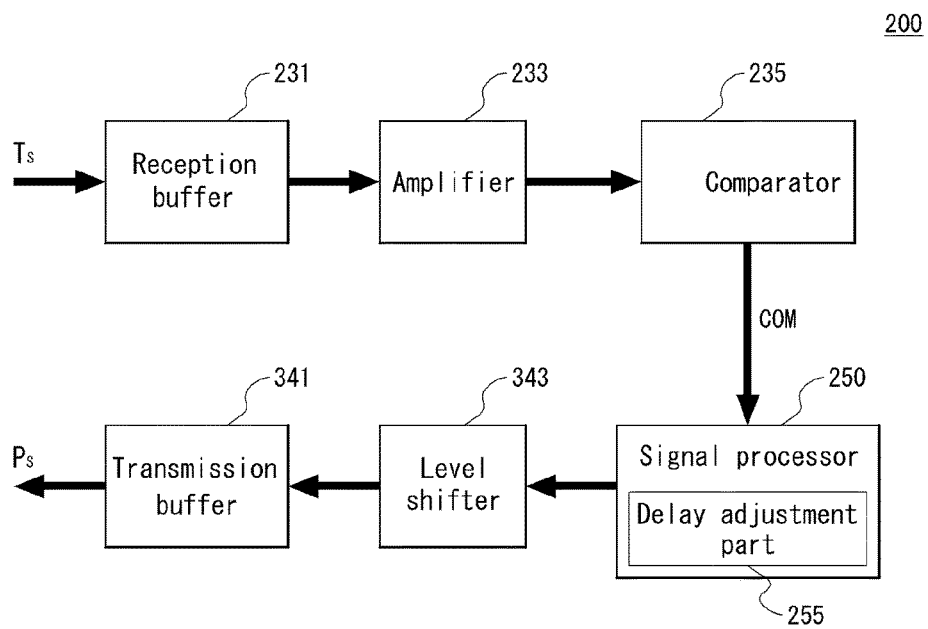
FIGS. 15 through 18 show a method of precise synchronization between the pen driving signal and the touchscreen driving signal regardless of the proximity between the stylus pen and the touchscreen.

Referring to FIG. 15, in the present invention, the synchronization timing is determined by adjusting the amount of delay from the rising or falling edge of a comparator output signal based on the pulse width of the comparator output signal. To this end, the stylus pen 200 of this invention further comprises a delay adjustment part 255 within the signal processor 250.

The signal processor 250 adjusts the amount of delay from the rising or falling edge of a comparator output signal COM based on the pulse width of the comparator output signal COM by controlling the operation of the delay adjustment part 255. The signal processor 250 measures the pulse width of the comparator output signal COM, adjusts the amount of delay based on the measurement, and determines the output timing of a pen driving signal Ps based on the adjusted amount of delay. Specifically, if the measurement is greater than a default pulse width, the signal processor 250 controls the delay adjustment part 260 such that the amount of delay is less than the default delay stored in the internal register, and in contrast, if the measurement is less than the default pulse width, the signal processor 250 controls the delay adjustment part 260 such that the amount of delay is greater than the default delay.

After adjusting the amount of delay, the signal processor 250 determines the output timing of the pen driving signal based on the adjusted amount of delay from the rising or falling edge of the comparator output signal COM.

Figure 16:
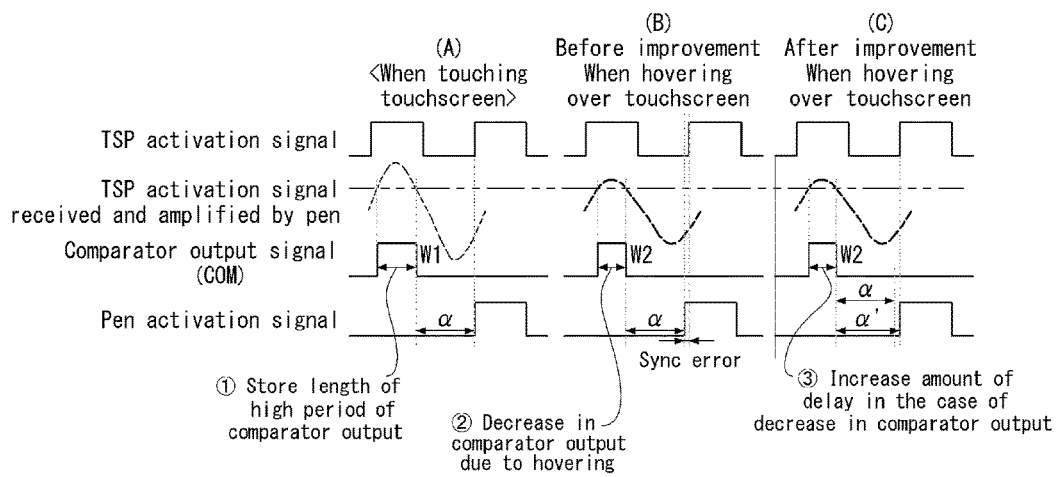

According to the present invention, as shown in FIG. 16, even if the strength of a touchscreen driving signal received by the stylus pen changes depending on the proximity between the touchscreen and the stylus pen, the pen driving signal can be synchronized with the touchscreen driving signal regardless of the proximity by adjusting the amount of delay applied to the comparator output signal based on the proximity. For example, the comparator output signal has a first pulse width W1 when touching the touchscreen as shown in (A) of FIG. 16, whereas it has a second pulse width W2 when hovering over the touchscreen. Thus, in the present invention, the amount of delay α' used when hovering over the touchscreen is larger than the amount of delay α used when touching the touchscreen, as shown in (C) of FIG. 16. This can prevent a synchronization error caused by the use of the fixed amount of delay α shown in (B) of FIG. 16.

The signal processor 250 generates the pen driving signal Ps in synchronization with the touchscreen driving signal Ts after the adjusted amount of delay from the rising or falling edge of the comparator output signal COM. According to the present invention, the synchronization between the pen driving signal and the touchscreen driving signal is kept from being distorted even with a change in the proximity between the touchscreen and the stylus pen.

Referring to FIGS. 17 and 18, along with FIG. 15, the process S4 of performing synchronization using the amplifier 233, comparator 235, and signal processor 250 according to the present invention will be described in detail below.

In the method of synchronization according to the present invention, a touchscreen driving signal input from the touchscreen is amplified by the amplifier 233, the signal amplified by the amplifier 233 is compared with a default reference voltage by the comparator 235, and a comparator output signal is output to the signal processor 250 (S41 and S42).

The signal processor 250 adjusts the amount of delay applied to the comparator output signal based on the pulse width of the comparator output signal input from the comparator 235. The signal processor 250 counts the pulse widths (high periods Th from the rising edge to the falling edge) of the comparator output signal by using an internal counter, and compares the count with the default count stored in the internal register. If the count is greater than the default count, the signal processor 250 decreases the adjusted amount of delay to less than the default delay. In contrast, if the count is less than the default count, the signal processor 250 increases the adjusted amount of delay to greater than the default delay. Meanwhile, if the count is equal to the default count, the signal processor 250 keeps the adjusted amount of delay at the default delay (S43).

The signal processor 250 determines the output timing of the pen driving signal Ps based on the adjusted amount of delay applied to the comparator output signal to synchronize the pen driving signal Ps with the touchscreen driving signal Ts. That is, the signal processor 250 decides to output the pen driving signal Ps after the adjusted amount of delay Td from the rising edge RE or falling edge FE of the comparator output signal to synchronize the pen driving signal Ps with the touchscreen driving signal Ts (S44 and S45).

By adjusting the amount of delay applied to the comparator output signal based on the pulse width of the comparator output signal and then determining the output timing of the pen driving signal Ps based on the adjusted amount of delay from the rising or falling edge of the comparator output signal, the synchronization between the touchscreen driving signal TS and the pen driving signal Ps is kept from being distorted, even with a change in the proximity between the touchscreen and the stylus pen or even with a change in the strength of the touchscreen driving signal due to external noise. Accordingly, as shown in FIG. 18, when the touchscreen is touched, the strength of touch sensing signals is kept constant regardless of the proximity, thereby greatly improving the touch performance.

As discussed above, the present invention offers the advantage of simplifying the system structure while maintaining high touch sensitivity because the conductive tip of the stylus pen is used as a medium for sending and receiving the touchscreen driving signal and the pen driving signal, even without adding a circuit (or electrode) to a display device to activate the stylus pen. According to the present invention, the display device requires no electromagnetic sensor for activating the stylus pen because of the simplified touchscreen structure—especially in the case of an in-cell type touchscreen with touch sensors embedded in a pixel array.

The stylus pen generates a pen driving signal based on a touchscreen driving signal input from the touchscreen, which enables accurate detection of a touch from the pen during a touch sensor driving period and therefore provides accuracy in touch detection. Accordingly, the stylus pen has high sensitivity and keeps the linearity of touch detection, thereby improving the touch performance. Moreover, the use of this stylus pen gives better touch sensitivity compared to a finger's touch.

In particular, in the present invention, the pen driving signal is synchronized with the touchscreen driving signal based on the adjusted amount of delay from the rising or falling edge of the comparator output signal, after the amount of delay applied to the comparator output signal is adjusted based on the pulse width of the comparator output signal. Thus, the synchronization between the touchscreen driving signal and the pen driving signal is maintained regardless of changes in the proximity between the stylus pen and the touchscreen, and therefore the strength of touch sensing signals is kept constant under the same condition, thereby greatly improving the touch performance.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A touch sensing system comprising a touchscreen with a plurality of touch electrodes, to which a touchscreen driving signal is applied, and a stylus pen that generates a pen driving signal based on the touchscreen driving signal and transmits the same to the touchscreen, the stylus pen comprising:
    an amplifier configured to amplify the touchscreen driving signal to generate an amplified signal;
    a comparator configured to compare the amplified signal with a preset reference voltage to generate a comparator output signal; and
    a signal processor configured to measure the pulse width of the comparator output signal, adjust an amount of delay based on a measurement, and determine an output timing of the pen driving signal based on an adjusted amount of delay to synchronize the pen driving signal with the touchscreen driving signal.

2. The touch sensing system of claim 1, wherein the signal processor decides to output the pen driving signal after the adjusted amount of delay from a rising or falling edge of the comparator output signal.

3. The touch sensing system of claim 2, wherein the signal processor counts a high period of the comparator output signal by using an internal counter, and compares the count with a default count stored in an internal register,
    wherein the count corresponds to the measurement, and the default count corresponds to a default pulse width for the comparator output signal.

4. The touch sensing system of claim 3, wherein, if the count is greater than the default count, the signal processor decreases the adjusted amount of delay to less than a default delay stored in the internal register, if the count is less than the default count, the signal processor increases the adjusted amount of delay to greater than the default delay, and if the count is equal to the default count, the signal processor keeps the adjusted amount of delay at the default delay.

5. The touch sensing system of claim 1, wherein the stylus pen further comprises:
    a conductive tip that is coupled to the touchscreen when touching or hovering over the touchscreen to receive the touchscreen driving signal from the touchscreen and transmit the pen driving signal to the touchscreen; and
    a switching part that is connected to the conductive tip and transmits the touchscreen driving signal to the amplifier and the pen driving signal to the conductive tip.

6. The touch sensing system of claim 1, wherein at least one frame of a signal switching period is provided between a first period for receiving the touchscreen driving signal and a second period for transmitting the pen driving signal, and the signal processor determines the output timing of the pen driving signal using the signal switching period and generates the pen driving signal at the output timing.

7. A driving method of a touch sensing system, the method comprising:
    receiving a touchscreen driving signal by a stylus pen by bringing the stylus pen into contact with the touchscreen or hovering the stylus pen over the touchscreen;
    amplifying the touchscreen driving signal to generate an amplified signal;
    comparing the amplified signal with a preset reference voltage to generate a comparator output signal;

measuring the pulse width of the comparator output signal, adjusting the amount of delay based on the measurement, and determining the output timing of the pen driving signal based on an adjusted amount of delay to synchronize the pen driving signal with the touchscreen driving signal; and sending the pen driving signal synchronized with the touchscreen driving signal to the touchscreen from the stylus pen.

8. The method of claim 7, wherein, in the synchronizing of the pen driving signal with the touchscreen driving signal, it is decided to output the pen driving signal after the adjusted amount of delay from a rising or falling edge of the comparator output signal.

9. The method of claim 8, wherein, in the synchronizing of the pen driving signal with the touchscreen driving signal, a high period of the comparator output signal is counted by using an internal counter, and the count is compared with a default count stored in an internal register, wherein the count corresponds to the measurement, and the default count corresponds to a default pulse width for the comparator output signal.

10. The method of claim 9, wherein, in the synchronizing of the pen driving signal with the touchscreen driving signal, if the count is greater than the default count, the adjusted amount of delay is decreased to less than a default delay stored in the internal register, if the count is less than the default count, the adjusted amount of delay is increased to greater than the default delay, and if the count is equal to the default count, the adjusted amount of delay is kept at the default delay.

11. The method of claim 7, wherein at least one frame of a signal switching period is provided between a first period for receiving the touchscreen driving signal and a second period for transmitting the pen driving signal, and, in the synchronizing of the pen driving signal with the touchscreen driving signal, the output timing of the pen driving signal is determined using the signal switching period, and the pen driving signal is generated at the output timing.

12. A stylus pen that generates a pen driving signal based on the touchscreen driving signal and transmits the same to the touchscreen, the stylus pen comprising:

an amplifier configured to amplify the touchscreen driving signal to generate an amplified signal;

a comparator configured to compare the amplified signal with a preset reference voltage to generate a comparator output signal; and a signal processor configured to measure the pulse width of the comparator output signal, adjusts an amount of delay based on a measurement, and determine an output timing of the pen driving signal based on an adjusted amount of delay to synchronize the pen driving signal with the touchscreen driving signal.

13. The stylus pen of claim 12, wherein the signal processor decides to output the pen driving signal after the adjusted amount of delay from a rising or falling edge of the comparator output signal.

14. The stylus pen of claim 13, wherein the signal processor counts a high period of the comparator output signal by using an internal counter, and compares the count with a default count stored in an internal register, wherein the count corresponds to the measurement, and the default count corresponds to default pulse width for the comparator output signal.

15. The stylus pen of claim 14, wherein, if the count is greater than the default count, the signal processor decreases the adjusted amount of delay to less than a default delay stored in the internal register, if the count is less than the default count, the signal processor increases the adjusted amount of delay to greater than the default delay, and if the count is equal to the default count, the signal processor keeps the adjusted amount of delay at the default delay.

16. The stylus pen of claim 12, further comprising:

a conductive tip that is coupled to the touchscreen when touching or hovering over the touchscreen to receive the touchscreen driving signal from the touchscreen and transmit the pen driving signal to the touchscreen; and a switching part that is connected to the conductive tip and transmits the touchscreen driving signal to the amplifier and the pen driving signal to the conductive tip.

17. The stylus pen of claim 12, wherein at least one frame of a signal switching period is provided between a first period for receiving the touchscreen driving signal and a second period for transmitting the pen driving signal, and the signal processor determines the output timing of the pen driving signal using the signal switching period and generates the pen driving signal at the output timing.

* * * * *